No. 838,141. PATENTED DEC. 11, 1906.
H. SANDVOSS.
SIGNAL APPARATUS.
APPLICATION FILED APR. 5, 1906.

Witnesses:
William Schulz
Ernest Pfennigwerth

Inventor:
Hermann Sandvoss

UNITED STATES PATENT OFFICE.

HERMANN SANDVOSS, OF NEUSS, GERMANY.

SIGNAL APPARATUS.

No. 838,141. Specification of Letters Patent. Patented Dec. 11, 1906.

Application filed April 5, 1906. Serial No. 309,983.

*To all whom it may concern:*

Be it known that I, HERMANN SANDVOSS, a subject of the German Emperor, residing at Neuss-on-the-Rhine, Germany, have invented new and useful Improvements in Signal Apparatus, of which the following is a specification.

This invention relates to a signal apparatus more particularly designed for operating an alarm when the temperature of a room rises above or falls below the degree desired. The apparatus may also be applied to parts of a machine in order to indicate when the same assume an excessive high temperature.

Figure 1:
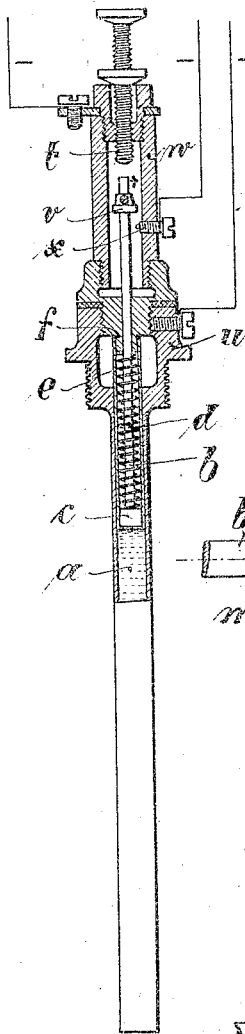
Figure 2:
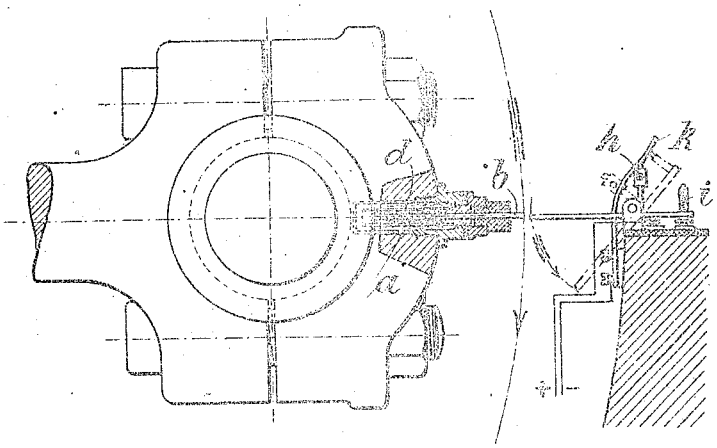
Figure 3:
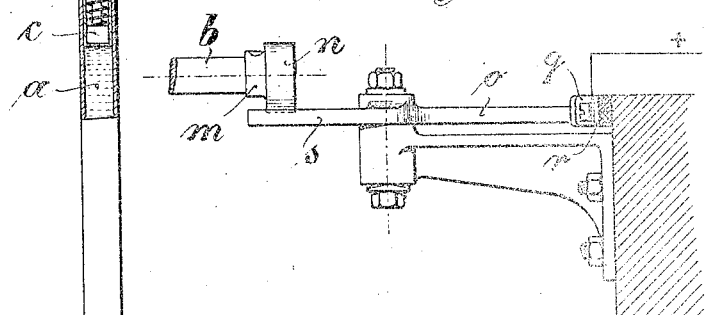
Figure 4:
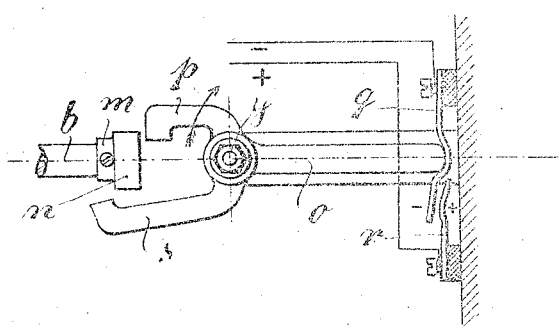

In the accompanying drawings, Figure 1 is a longitudinal section through my improved signal apparatus. Fig. 2 shows the same applied to a pitman-head of an engine. Fig. 3 is a side view of a modification of the signal apparatus; Fig. 4, a front view, partly in section thereof; and Fig. 5 a plan of Fig. 4.

The apparatus, which is influenced by the temperature, consists of a tubular casing $a$, containing a rod or plunger $b$. It is advisable to furnish this rod with a collar $c$, which supports the spring $d$ and which serves at the same time as an object on which to attach the elastic mantle or pipe $e$, which prevents the liquid from coming into contact with the rod $b$, as it covers the rod just as far as the latter engages into the casing $a$. For this reason the pipe or hose is preferably attached to the screw $f$, which closes casing $a$.

When the liquid is expanded by the heat, the rod is moved outwardly, while when the temperature falls the spring $d$ or other suitable means forces the rod back, whereby the alarm is actuated both forward and backward.

If in the example taken in Fig. 1 the rod $b$ is actuated by the heat, it touches the screw $t$, forming one of the contacts, and rings the alarm, the housing $u$ of the rod being under current. If the heat diminishes, the rod, influenced by a spring $d$, a weight, or similar means, is driven back until the collar $v$ on the rod engages the contact $x$, which is brought through the housing, so that an alarm is rung. This contact, also, may be adjustable.

The above-described apparatus needs only one contact for high temperature and a second contact for low temperature. If, therefore, the heat or cold decreases after having actuated the alarm, the rod returns from the contacts and stops the alarm, which may be actuated in any other manner—as, for example, releasing a mechanical contrivance, etc.

In the mode of construction shown in Fig. 2, where the alarm is on a connecting-rod bearing, the rod when forced outward out of the housing $a$ by the temperature strikes against the lever $g$, which is kept in its place by a weight $h$ coming beyond the point of balance. The lever falls as soon as the weight passes the center, and the contact-screw $i$ falls against the contact-spring $k$, closing the current, which must subsequently be switched off by hand. By these means an alarm is operated which indicates that the pitman-bearing is overheated and requires lubrication. The supply of lubricant could also be controlled by the alarm.

Figure 5:
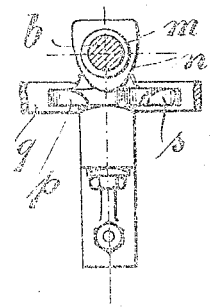

In Figs. 3–5 a modification of my improved signal apparatus is shown, in which the current operating the alarm is automatically broken after the heat has been reduced.

The free end of rod or plunger $b$ is provided with a collar $m$, having a substantially triangular head $n$, Fig. 5. Opposite plunger $b$ there is pivoted at $y$ a three-arm lever $p\ s\ v$. Arm $v$ of this lever engages a first contact-spring $q$ in such a manner that the lever when tilted will press spring $q$ against a second contact-spring $r$ to close a circuit. Lever-arm $p$ is shorter than arm $s$, as shown in Fig. 4. The parts are so assembled that the head $n$ during its travel with the pitman-head normally clears both arms $p$ and $s$. If plunger $b$ is advanced by excessive heat, it will strike against the free end of lever $p$, to thereby tilt lever $p\ s\ v$ in the direction of the arrow, Fig. 4, and close contact $q\ r$. When the pitman-head has been gradually cooled, plunger $b$ will recede to strike against arm $s$ and return lever $p\ s\ v$ to its normal position, whereby contact $q\ r$ is broken.

Having now fully described my invention, what I claim as new, and desire to secure by Letters Patent, is—

In a signal apparatus, a tubular casing, combined with an inclosed expansible liquid and a headed plunger, an elastic mantle surrounding the plunger and secured to the plunger-head and casing, and a contact on the plunger adapted to operate an alarm, substantially as specified.

Signed by me at Düsseldorf, Germany, this 15th day of March, 1906.

HERMANN SANDVOSS.

Witnesses:
 WILLIAM ESSENWEIN,
 PETER LIEBER.